CATALYTIC PROCESS FOR THE PRODUCTION OF DIOLEFINS
Filed Dec. 23, 1971
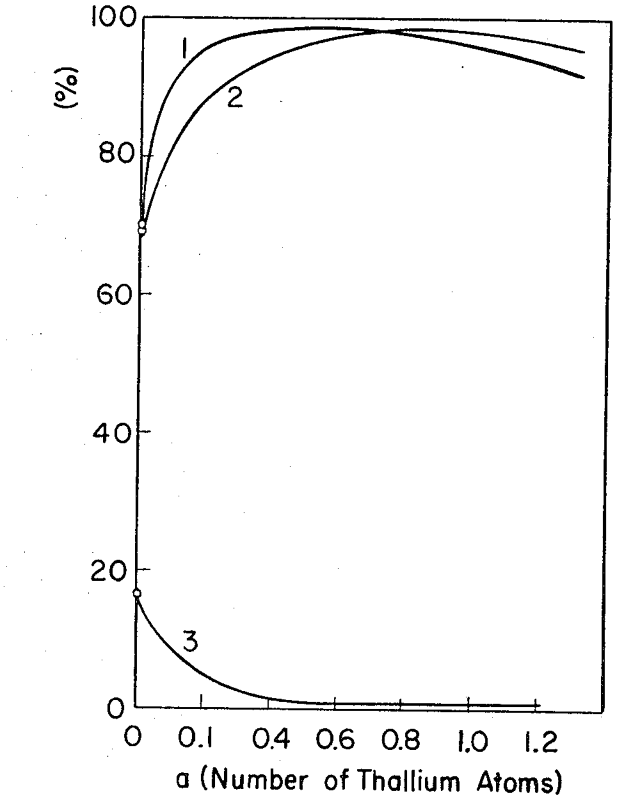

United States Patent Office 3,801,670

Patented Apr. 2, 1974

1

3,801,670

CATALYTIC PROCESS FOR THE PRODUCTION OF DIOLEFINS

Tatsuo Shiraishi, Shinkichi Shimizu, Akihiko Atsumi, and Hiroshi Ichihashi, Niihama, Japan, assignors to Sumitomo Chemical Company Limited Filed Dec. 23, 1971, Ser. No. 211,608
Claims priority, application Japan, Dec. 25, 1970, 45/129,004; Aug. 28, 1971, 46/66,136; Aug. 30, 1971, 46/67,166
Int. Cl. C07c *5/18*
U.S. Cl. 260—680 E 15 Claims

ABSTRACT OF THE DISCLOSURE

A catalytic process for production of diolefins having 4 to 8 carbon atoms by vapor phase oxidation which comprises contacting monoolefins having 4 to 8 carbon atoms and oxygen with a solid catalyst composition comprising a catalyst system of the formula:

$$Tl_aP_bMo_cFe_dBi_eX_fY_gO_h$$

wherein *a, b, c, d, e* and *h* each represents the number of the respective atoms, X is one or more of Ni, Co, Mg and Mn, *f* represents the total number of one or more atoms of Ni, Co, Mg and Mn, Y is one or more of Cu, Ca, Sr, Zn, Cd, Sn, Be, Cr and Pb, and *g* represents the total number of one or more atoms of Cu, Ca, Sr, Zn, Cd, Sn, Be, Cr and Pb, provided that, in case of *c* being 12, *a* is 2 or less but not 0, *b* is 0 to 5, *d* is 0.1 to 20, *e* is 0.1 to 5, *f* is 2 to 15, *g* is 0 to 12, and *h* is decided depending on the number of the other atoms and usually from 38.3 to 128. By such process, diolefins are produced in a high selectivity and an excellent yield.

The present invention relates to a catalytic process for the production of diolefins. More particularly, this invention relates to a process for the selective production of diolefins by the vapor phase oxidative dehydrogenation of monoolefins in the presence of a specific catalyst system.

For the production of diolefins, such as butadiene and isoprene, useful as raw materials in the manufacture of synthetic rubbers, there have been known the dehydrogenation method, the oxidative dehydrogenation method, the broad-sense oxidative dehydrogenation method using halogen as a hydrogen-acceptor, and the like. Among them, the dehydrogenation method is unsatisfactory from the industrial viewpoint, because the dehydrogenation is so restricted in the sense of the chemical equilibrium theory that each pass yield of diolefins is relatively poor. Since the dehydrogenation is an endothermic reaction, outer heating is required and high temperatures are desired for execution of this reaction. On the other hand, the oxidative dehydrogenation is not substantially restricted in the sense of equilibrium theory, and so it is theoretically possible to prepare diolefins in a yield of almost 100% by using any catalyst composition of high activity. When, however, performed by known techniques, carbon monoxide, carbon dioxide, aldehydes and the like are by-produced, and the yield of diolefins is not sufficient. For improving the yield of diolefins, the addition of halogen or sulfur compounds as a hydrogen-acceptor has been

2 proposed, but the reaction using such corrosive material is disadvantageous in the industrial practice, because the product is contaminated with impurities and suitable apparatus for separating or recovering the halogen or sulfur compounds from the reaction mixture is required. Further, expensive means must be provided for protecting such apparatus from the corrosion.

As the result of the study seeking a catalyst composition suitable for the preparation of diolefins in a high yield by dehydrogenating monoolefins oxidatively, it has been found that a catalyst system comprising Tl, P, Mo, Fe, Bi, at least one of Ni, Co, Mg and Mn, at least one of Cu, Ca, Sr, Zn, Cd, Sn, Be, Cr and Pb, and O meets such requirements. This invention is based on this finding.

According to the present invention, there is provided a process for the preparation of diolefins having 4 to 8 carbon atoms by the vapor phase oxidative dehydrogenation which comprises contacting monoolefins having 4 to 8 carbon atoms and oxygen at high temperature with a solid catalyst composition comprising a catalyst system of the formula: $Tl_aP_bMo_cFe_dBi_eX_fY_gO_h$ wherein *a, b, c, d, e* and *h* each represents the number of the respective atoms, X is one or more of Ni, Co, Mg and Mn, *f* represents the total number of one or more atoms of Ni, Co, Mg and Mn, Y is one or more of Cu, Ca, Sr, Zn, Cd, Sn, Be, Cr and Pb, and *g* represents the total number of one or more atoms of Cu, Ca, Sr, Zn, Cd, Sn, Be, Cr and Pb, provided that, in case of *c* being 12, *a* is 2 or less but not 0 (preferably 0.01 to 1.5), *b* is 0 to 5 (preferably 0.01 to 2), *d* is 0.1 to 20 (preferably 0.5 to 20), *e* is 0.1 to 5 (preferably 0.5 to 5), *f* is 2 to 15, *g* is 0 to 12 (preferably 0 to 8), especially preferably *f* plus *g* being 2 to 15, and *h* is decided depending on the number of the other atoms and usually from 38.3 to 128 (preferably 39.5 to 103.8) (hereinafter referred to as "Tl catalyst system") to produce diolefins in a high selectivity and an excellent yield per each pass.

The catalyst composition used in the present invention is quite characteristic in containing thallium, and the catalystic activity and selectivity depend largely on the content of thallium. For instance, the figure in the attached drawings shows the relationship of the conversion of butene-1 (curve 1), the selectivity of butadiene (curve 2) and the total selectivities of carbon monoxide and carbon dioxide (curve 3) with the content of thallium (i.e. the number of thallium atoms) in the preparation of butadiene by the oxidative dehydrogenation of butene-1 in the presence of $$Tl_aP_{0.1}Mo_{12}Fe_1Bi_1Ni_{4.5}Co_4O_h$$

Compared with the corersponding catalyst system containing no thallium, the Tl catalyst system of the invention accelerates the reaction rate of monoolefins and suppresses markedly the by-production of carbon monoxide, carbon dioxide and the like so that the selectivity to diolefins is highly increased. It is still interesting that the isomerization of monoolefins (e.g. conversion of butene-1 into butene-2), occurs with more difficulty in the Tl catalyst system than in the corresponding non-Tl catalyst system.

Particularly notable in that diolefins can be produced in a higher yield by the process of this invention than by known methods. When, for instance, butene-1 is employed as the starting material, the per pass yield of butadiene in the reaction at 290° C. is 94%, as shown in Example 3. The catalyst life of the Tl catalyst system is longer, and the catalyst activity is elevated with the elapse of time, whereby the per pass yield is apt to increase. The reaction can be controlled easily without undesirable elevation of the reaction temperature, because the amount of by-products (i.e. carbon monoxide, carbon dioxide) is small and much heat is not generated. The reaction can be accomplished satisfactorily at a comparatively low temperature (about 300° C.), and this is advantageous from the industrial viewpoint.

The Tl catalyst system of this invention is also effective for the oxidative dehydrogenation of monoolefins having 5 or more carbon atoms. When, for instance, isopentene is used as the starting material, isoprene can be produced in a high yield per each pass and a high selectivity, as shown in the examples.

The starting materials in the vapor phase oxidative dehydrogenation of the invention are monoolefins having 4 to 8 carbon atoms and oxygen. As the monoolefins, there may be used not only a high purity of monoolefins but also a mixture of monoolefins with any saturated hydrocarbons (e.g. butane, pentane). As the oxygen source, there may be employed pure oxygen gas, air enhanced or not in the oxygen concentration or any other molecular oxygen-containing gas. From the economical viewpoint, the use of air is preferred. As the case may be, steam is introduced into the reaction system including the monoolefins and oxygen for increasing the selectivity of the objective diolefins to enhance their yields. If desired, an appropriate inert gas such as nitrogen, carbon dioxide or argon may be used as a diluent.

For preparation of the catalyst system, there may be used any material which can form a metal oxide complex on calcination such as the component metal itself or its oxide or salt. For instance, there may be specifically employed thallium compounds such as metallic thallium, thallium nitrate, thallium carbonate, thallium chloride, thallium oxide or thallium hydroxide, phosphorus compounds such as phosphoric acid, ammonium phosphate or phosphorus pentoxide, molybdenum compounds such as ammonium phosphomolybdate, ammonium molybdate, molybdenum oxide, molybdenic acid or phosphomolybdic Mg, Mn, Cu, Ca, Sr, Zn, Cd, Sn, Be, Cr and Pb) such as the nitrate, chloride, acetate or oxide thereof.

The catalyst composition may be prepared by a conventional procedure. For example, a thallium salt, an iron salt, a bismuth salt, a phosphorus compound, one or more of a nickel salt, a cobalt salt, a magnesium salt and a manganese salt, and if desired, one or more of a copper salt, a calcium salt, a strontium salt, a zinc salt, a cadmium salt, a tin salt, a beryllium salt, a chromium salt, and a lead salt are added to an aqueous solution of a molybdate such as ammonium molybdate, the resulting slurry is admixed with a carrier material and evaporated to dryness, and the resultant cake is calcined at 200 to 400° C. in atmosphere and, after cooling, crushed, shaped into pellets or granules, and recalcined at 400 to 600° C. in the atmosphere.

The catalyst system may be used as such but is favorably incorporated with a suitable carrier (e.g. silica, alumina, silicon carbide, titanium oxide). The amount of the carrier is varied with its kind and is usually less than 90% by weight, preferably from 5 to 90% by weight, of the catalyst composition.

The production of diolefins using the catalyst composition of this invention may be effected by a fluidized bed process or a fixed bed process. The particle size of the catalyst composition is not particularly limited and may be optionally varied with the type of its use. The reaction temperature is associated with the kind of the catalyst composition and that of the reactant composition and is usually from 230 to 400° C. When the reaction is effected at an excessively elevated temperature above 400° C., there is an inclination to increase the production of oxygen-containing by-products (e.g. unaturated aldehydes, unsaturated carboxylic acids, furan, ketones) whereby the production of diolefins lowers disadvantageously. The reaction pressure is usually from 0.5 to 10 absolute atmospheres.

The molar ratio of the starting monoolefins and oxygen may be within a range of 1:0.2–10, preferably 1:0.8–8. When steam is introduced, it may be used in a ratio of from 0 to 60 mol, preferably from 2 to 30 mol, to 1 mol of the monoolefin. The space velocity of the starting reactants for contacting with the solid catalyst is ordinarily from 100 to 10,000 litre.gas/litre.catalyst/hr., preferably from 200 to 5,000 litre.gas/litre.catalyst/hr.

Some of the advantages brought above by the use of the Tl catalyst system, compared with the use of the non-Tl catalyst system, are as follows:

(1) The Tl catalyst system is much higher (e.g. 10% more) in the conversion of monoolefins.

(2) The by-production of excessively oxidized substances is extremely suppressed in case of using the Tl catalyst system and, therefore, the selectivity to diolefins is much higher.

(3) Since the by-production of excessively oxidized substances is suppressed, the generation of heat is small and the temperature distribution in the catalyst bed is also uniform, whereby the regulation of the reaction conditions can be made with facility.

(4) As the by-production of excessively oxidized substances is suppressed, the purification of the produced diolefins can be made easily.

(5) The Tl catalyst system is highly active even at a low temperature, and it can be used with a longer catalytic life.

Presently preferred and practical embodiments of the present invention are illustratively shown in the following examples, wherein the conversion of monoolefins, the selectivity to the product and the yield of the product are calculated respectively according to the equations:

Conversion of monoolefin (percent)

$$=\frac{\text{Reacted monoolefin (mol)}}{\text{Feed monoolefin (mol)}}\times 100$$

Selectivity (percent)

$$=\frac{\text{Weight of carbon atoms in product}}{\text{Weight of carbon atoms in reacted monoolefin}}\times 100$$

Yield of product (percent) per each pass $$=\frac{\text{(Conversion of monoolefin)}}{\text{(Selectivity of product)}}\times\frac{1}{100}$$

Space velocity $$=\frac{\text{Flow volume of feed gas per hour (litre. gas/hr.)}}{\text{Volume of catalyst (litre. catalyst)}}$$

EXAMPLE 1

A solution of bismuth nitrate (12.13 g.) in a mixture of conc. nitric acid (4 ml.) and water (30 ml.) is combined with a solution of ferric nitrate (10.10 g.), nickel nitrate (39.99 g.), magnesium nitrate (6.41 g.), cobalt nitrate (7.28 g.), manganese nitrate (7.18 g.) and thallium nitrate (4.00 g.) in water (250 ml.). To the resultant mixture, a solution of ammonium molybdate (52.98 g.) and conc. phosphoric acid (85% by weight; 0.29 g.) in a mixture of aqueous ammonia, ($NH_3$, 28% by weight; 30 ml.) and water (300 ml.) is added, and the mixture is stirred well to make a dispersion. Silica sol ($SiO_2$, 20% by weight; 100 ml.) is added thereto under vigorous stirring. The resultant dispersion is evaporated to dryness, and the residue is calcined at 300° C. for 3 hours (1st calcination), cooled and crushed. The obtained powder is tableted and calcined at 525° C. for 6 hours in the atmosphere (2nd calcination) to give a catalyst composition, of which the active components correspond to the formula: $Mo_{12}Bi_1Fe_1Tl_{0.6}Ni_{5.5}Co_1Mg_1Mn_1P_{0.1}O_{48.6}$ (wherein the carrier is omitted).

In a glass-made reaction tube of 12 mm. in inner diameter, the catalyst composition (6 ml.) as obtained above is charged and heated up to 310° C. A gaseous mixture of butene-1, air and steam (1:19:20 in a molar ratio) is introduced into the reaction tube at a space velocity of 840 litre.gas/litre.catalyst/hr., whereby butadiene is produced. The conversion of butene-1 is 95%, the selectivity to butadiene is 96%, the selectivities of carbon monoxide and carbon dioxide are respectively 0.3% and 1.6%, and the per pass yield of butadiene is 91%.

EXAMPLES 2 TO 38

In the same manner as in Example 1 but using various catalyst compositions as shown in Table 1, the catalytic reaction of butene-1 to butadiene is carried out. The results are shown in Table 1.

EXAMPLES 39 TO 51

In the same manner as in Example 1 but using various catalyst compositions as shown in Table 2, the catalytic reaction of butene-2 (a mixture of cis-butene-2 (50.2%) and trans-butene-2 (49.8%)) to butadiene is carried out. The results are shown in Table 2.

EXAMPLES 52 TO 59

The catalyst compositions (each 6 ml.) prepared as in Example 1 and shown in Table 3 are each charged in the same reactor as in Example 1, and the catalytic reaction of 3-methylbutene-1, 2-methylbutene-1, 2-methylbutene-2 and their mixture is carried out under reaction conditions as shown in Table 3, whereby isoprene is obtained. The results are shown in Table 3.

EXAMPLES 60 TO 63

Using the catalyst compositions prepared as in Example 1, the catalytic reaction of 3-methylbutene-1 is carried out under reaction conditions as shown in Table 4, whereby isoprene is obtained. The results are shown in Table 4.

TABLE 1

| Example number | Catalyst composition | | | | | | | | | | | | | | | | | | 2d calcined temp. (° C.) | Reaction condition | | Feed composition (molar ratio) | | | Butene per pass conversion, (percent) | Selectivity (percent) | | | Butadiene per pass yield, percent |
|---|---|---|---|---|---|---|---|---|---|---|---|---|---|---|---|---|---|---|---|---|---|---|---|---|---|---|---|---|---|
| | Tl | P | Mo | Fe | Bi | Ni | Co | Mg | Mn | Cu | Ca | Sr | Zn | Cd | Sn | Be | Cr | Pb | O | | Reaction temp. (° C.) | Space velocity, hr.⁻¹ | Butene-1 | Air | Steam | | Butadiene | CO | $CO_2$ | |
| 2 | 0.6 | 0.1 | 12 | 1 | 1 | 5.5 | 2 | 0.5 | 0.5 | 0 | 0 | 0 | 0 | 0 | 0 | 0 | 0 | 0 | 48.6 | 525 | 310 | 860 | 1 | 19 | 21 | 90 | 97 | 0.2 | 1.0 | 87 |
| 3 | 0.6 | 0.1 | 12 | 1 | 1 | 4.5 | 2 | 2 | 0 | 0 | 0 | 0 | 0 | 0 | 0 | 0 | 0 | 0 | 48.6 | 550 | 290 | 840 | 1 | 19 | 20 | 97 | 97 | 0.2 | 0.8 | 94 |
| 4 | 0.6 | 0.1 | 12 | 1 | 1 | 5.5 | 1.5 | 0 | 1.5 | 0 | 0 | 0 | 0 | 0 | 0 | 0 | 0 | 0 | 48.6 | 550 | 290 | 850 | 1 | 19 | 19 | 89 | 98 | 0.1 | 0.7 | 88 |
| 5 | 0.6 | 0.1 | 12 | 1 | 1 | 5.5 | 0 | 2.5 | 0.5 | 0 | 0 | 0 | 0 | 0 | 0 | 0 | 0 | 0 | 48.6 | 525 | 270 | 850 | 1 | 20 | 20 | 94 | 97 | 0.3 | 1.3 | 91 |
| 6 | 0.5 | 0.1 | 12 | 1 | 1 | 7.5 | 0 | 0 | 1 | 0 | 0 | 0 | 0 | 0 | 0 | 0 | 0 | 0 | 48.5 | 550 | 310 | 840 | 1 | 18 | 19 | 96 | 96 | 0.2 | 1.2 | 93 |
| 7 | 0.3 | 0.1 | 12 | 1 | 1 | 4.5 | 0 | 0 | 4 | 0 | 0 | 0 | 0 | 0 | 0 | 0 | 0 | 0 | 48.2 | 525 | 290 | 840 | 1 | 18 | 19 | 89 | 91 | 1.2 | 5.4 | 81 |
| 8 | 0.6 | 0.1 | 12 | 1 | 1 | 4.5 | 4 | 0 | 0 | 0 | 0 | 0 | 0 | 0 | 0 | 0 | 0 | 0 | 48.6 | 550 | 310 | 870 | 1 | 11 | 12 | 99 | 96 | 0.2 | 1.0 | 95 |
| 9 | 0.6 | 0.1 | 12 | 1 | 1 | 4.5 | 4 | 0 | 0 | 0 | 0 | 0 | 0 | 0 | 0 | 0 | 0 | 0 | 48.6 | 550 | 310 | 870 | 1 | 15 | 16 | 96 | 93 | 0.2 | 1.0 | 89 |
| 10 | 0.6 | 0.1 | 12 | 1 | 1 | 4.5 | 4 | 0 | 0 | 0 | 0 | 0 | 0 | 0 | 0 | 0 | 0 | 0 | 48.6 | 550 | 310 | 2410 | 1 | 10 | 11 | 80 | 97 | 0.1 | 0.5 | 78 |
| 11 | 0.4 | 0.1 | 12 | 1 | 1 | 4.5 | 0 | 4 | 0 | 0 | 0 | 0 | 0 | 0 | 0 | 0 | 0 | 0 | 48.3 | 550 | 350 | 900 | 1 | 19 | 23 | 95 | 97 | 0.4 | 1.5 | 92 |
| 12 | 0.4 | 1 | 12 | 1 | 1 | 4.5 | 4 | 0 | 0 | 0 | 0 | 0 | 0 | 0 | 0 | 0 | 0 | 0 | 50.6 | 550 | 310 | 810 | 1 | 15 | 16 | 95 | 96 | 0.5 | 1.8 | 91 |
| 13 | 0.6 | 0.1 | 12 | 1 | 1 | 4.5 | 2 | 0 | 0 | 0 | 0 | 0 | 9 | 0 | 0 | 2 | 0 | 0 | 48.6 | 525 | 300 | 890 | 1 | 15 | 16 | 97 | 92 | 0.5 | 1.9 | 89 |
| 14 | 0.6 | 0.1 | 12 | 1 | 1 | 4.5 | 2 | 0 | 0 | 0 | 0 | 0 | 0 | 0 | 0 | 0 | 2 | 0 | 49.6 | 525 | 310 | 890 | 1 | 15 | 16 | 92 | 92 | 0.4 | 1.5 | 85 |
| 15 | 0.5 | 0.1 | 12 | 1 | 1 | 8.5 | 0 | 0 | 0 | 0 | 0 | 0 | 0 | 0 | 0 | 0 | 0 | 0 | 48.5 | 550 | 330 | 850 | 1 | 18 | 19 | 92 | 95 | 0.3 | 1.1 | 87 |
| 16 | 0.6 | 0.1 | 12 | 1 | 1 | 0 | 8.5 | 0 | 0 | 0 | 0 | 0 | 0 | 0 | 0 | 0 | 0 | 0 | 48.6 | 550 | 290 | 850 | 1 | 19 | 20 | 93 | 98 | 0.1 | 0.7 | 91 |
| 17 | 0.6 | 0 | 12 | 1 | 1 | 4.5 | 2 | 2 | 0 | 0 | 0 | 0 | 0 | 0 | 0 | 0 | 0 | 0 | 48.4 | 550 | 290 | 900 | 1 | 17 | 18 | 97 | 96 | 0.3 | 0.9 | 93 |
| 18 | 0.6 | 0.1 | 12 | 8 | 1 | 3 | 1.5 | 1.5 | 0 | 0 | 0 | 0 | 0 | 0 | 0 | 0 | 0 | 0 | 56.6 | 525 | 300 | 890 | 1 | 15 | 16 | 95 | 93 | 0.7 | 5.9 | 88 |
| 19 | 0.6 | 0.1 | 12 | 6 | 1 | 3 | 1.5 | 1.5 | 0 | 0 | 0 | 0 | 0 | 0 | 0 | 0 | 0 | 0 | 53.6 | 525 | 300 | 890 | 1 | 17 | 18 | 93 | 94 | 1.4 | 4.0 | 87 |
| 20 | 0.6 | 0.1 | 12 | 12 | 1 | 3 | 1.5 | 1.5 | 0 | 0 | 0 | 0 | 0 | 0 | 0 | 0 | 0 | 0 | 62.6 | 525 | 300 | 890 | 1 | 15 | 16 | 90 | 93 | 0.4 | 1.8 | 84 |
| 21 | 0.6 | 0.1 | 12 | 12 | 1 | 3 | 1.5 | 1.5 | 0 | 0 | 0 | 0 | 0 | 0 | 0 | 0 | 0 | 0 | 62.6 | 525 | 310 | 890 | 1 | 15 | 16 | 89 | 94 | 0.3 | 1.6 | 84 |
| 22 | 0.6 | 0.1 | 12 | 12 | 1 | 3 | 1.5 | 1.5 | 0 | 0 | 0 | 0 | 0 | 0 | 0 | 0 | 0 | 0 | 62.6 | 525 | 310 | 1,770 | 1 | 6 | 7 | 88 | 94 | 0.4 | 1.9 | 83 |
| 23 | 0.6 | 0.1 | 12 | 12 | 1 | 3 | 1.5 | 1.5 | 0 | 0 | 0 | 0 | 0 | 0 | 0 | 0 | 0 | 0 | 62.6 | 525 | 310 | 890 | 1 | 15 | 16 | 88 | 93 | 0.4 | 1.8 | 82 |
| 24 | 0.6 | 0.1 | 12 | 12 | 1 | 6 | 1.5 | 0 | 1.5 | 0 | 0 | 0 | 0 | 0 | 0 | 0 | 0 | 0 | 65.6 | 525 | 310 | 890 | 1 | 15 | 16 | 92 | 95 | 0.5 | 2.1 | 88 |
| 25 | 0.6 | 0.1 | 12 | 4 | 1 | 3 | 1.5 | 1.5 | 0 | 0 | 0 | 0 | 0 | 0 | 0 | 0 | 0 | 2 | 50.6 | 525 | 280 | 890 | 1 | 16 | 17 | 96 | 94 | 0.7 | 2.6 | 90 |
| 26 | 0.6 | 0.1 | 12 | 2 | 1 | 7 | 0 | 0 | 0 | 2 | 0 | 0 | 0 | 0 | 0 | 0 | 0 | 0 | 50.6 | 525 | 305 | 890 | 1 | 15 | 16 | 94 | 93 | 0.6 | 3.7 | 87 |
| 27 | 0.6 | 0.1 | 12 | 2 | 1 | 7 | 0 | 0 | 0 | 0 | 2 | 0 | 0 | 0 | 0 | 0 | 0 | 0 | 50.6 | 525 | 340 | 890 | 1 | 16 | 17 | 87 | 95 | 0.7 | 3.1 | 82 |
| 28 | 0.6 | 0.1 | 12 | 2 | 1 | 7 | 0 | 0 | 0 | 0 | 0 | 2 | 0 | 0 | 0 | 0 | 0 | 0 | 50.6 | 525 | 310 | 890 | 1 | 16 | 17 | 96 | 94 | 0.7 | 2.8 | 90 |
| 29 | 0.6 | 0.1 | 12 | 2 | 1 | 7 | 0 | 0 | 0 | 0 | 0 | 0 | 2 | 0 | 0 | 0 | 0 | 0 | 50.6 | 525 | 360 | 890 | 1 | 16 | 17 | 93 | 94 | 0.7 | 4.2 | 87 |
| 30 | 0.6 | 0.1 | 12 | 2 | 1 | 7 | 0 | 0 | 0 | 0 | 0 | 0 | 0 | 2 | 0 | 0 | 0 | 0 | 50.6 | 525 | 360 | 890 | 1 | 16 | 17 | 91 | 93 | 0.8 | 4.6 | 84 |
| 31 | 0.6 | 0.1 | 12 | 2 | 1 | 7 | 0 | 0 | 0 | 0 | 0 | 0 | 0 | 0 | 2 | 0 | 0 | 0 | 52.6 | 525 | 300 | 890 | 1 | 15 | 16 | 96 | 94 | 0.5 | 2.5 | 90 |
| 32 | 0.6 | 0.1 | 12 | 2 | 1 | 7 | 0 | 0 | 0 | 0 | 0 | 0 | 0 | 0 | 0 | 0 | 0 | 2 | 50.6 | 525 | 290 | 890 | 1 | 15 | 16 | 89 | 97 | 0.5 | 2.8 | 86 |
| 33 | 0.6 | 0.1 | 12 | 6 | 1 | 6 | 1.5 | 1.5 | 0 | 0 | 0 | 1 | 0 | 0 | 0 | 0 | 0 | 0 | 57.6 | 525 | 290 | 1,750 | 1 | 16 | 17 | 96 | 91 | 0.7 | 5.6 | 88 |
| 34 | 0.6 | 0.1 | 12 | 8 | 1 | 6 | 1.5 | 0 | 1.5 | 0 | 0 | 1 | 0 | 0 | 0 | 0 | 0 | 0 | 60.6 | 525 | 310 | 890 | 1 | 16 | 17 | 94 | 95 | 0.5 | 2.1 | 89 |
| 35 | 0.6 | 0.1 | 12 | 6 | 1 | 3 | 1.5 | 1.5 | 0 | 0 | 0 | 0 | 0 | 0 | 0 | 0 | 0 | 1 | 54.6 | 525 | 300 | 890 | 1 | 16 | 17 | 92 | 94 | 1.4 | 4.0 | 87 |
| 36 | 0.6 | 0.1 | 12 | 8 | 1 | 3 | 1.5 | 1.5 | 0 | 0 | 0 | 0 | 0 | 0 | 0 | 0 | 0 | 1 | 57.6 | 525 | 300 | 890 | 1 | 15 | 16 | 95 | 92 | 0.7 | 5.9 | 87 |
| 37 | 0.6 | 0.1 | 12 | 12 | 1 | 3 | 1.5 | 1.5 | 0 | 0 | 0 | 0 | 0 | 0 | 0 | 0 | 0 | 1 | 63.6 | 525 | 300 | 890 | 1 | 15 | 16 | 97 | 91 | 0.5 | 3.3 | 86 |
| 38 | 0.6 | 0.1 | 12 | 15 | 1 | 3 | 1.5 | 1.5 | 0 | 0 | 0 | 0 | 0 | 0 | 0 | 0 | 0 | 1 | 68.1 | 525 | 305 | 890 | 1 | 15 | 16 | 87 | 95 | 0.3 | 1.5 | 83 |

TABLE 2

| Example number | Catalyst composition: Tl | P | Mo | Fe | Bi | Ni | Co | Mg | Mn | Sr | Zn | Sn | Pb | O | 2d calcined temp. (° C) | Reaction condition: Reaction temp. (° C) | Space velocity (hr.⁻¹) | Feed composition (molar ratio): Butene-2 | Air | Steam | Butene per pass conversion (percent) | Selectivity (percent): Butadiene | CO | $CO_2$ | Butadiene per pass yield (percent) |
|---|---|---|---|---|---|---|---|---|---|---|---|---|---|---|---|---|---|---|---|---|---|---|---|---|---|
| 39 | 0.6 | 0.1 | 12 | 1 | 1 | 5.5 | 1 | 1 | 1 | 0 | 0 | 0 | 0 | 48.6 | 525 | 332 | 860 | 1 | 20 | 21 | 82 | 88 | 1.3 | 4.1 | 72 |
| 40 | 0.2 | 0.1 | 12 | 1 | 1 | 0 | 6 | 0 | 2 | 0 | 0 | 0 | 0 | 47.5 | 550 | 330 | 510 | 1 | 18 | 19 | 95 | 82 | 3.0 | 2.7 | 78 |
| 41 | 0.1 | 0.1 | 12 | 1 | 1 | 4.5 | 4 | 0 | 0 | 0 | 0 | 0 | 0 | 47.9 | 550 | 330 | 850 | 1 | 10 | 11 | 88 | 91 | 0.9 | 3.4 | 80 |
| 42 | 0.1 | 0.1 | 12 | 1 | 1 | 4.5 | 4 | 0 | 0 | 0 | 0 | 0 | 0 | 47.9 | 550 | 330 | 850 | 1 | 19 | 20 | 94 | 92 | 1.2 | 4.1 | 86 |
| 43 | 0.2 | 0.1 | 12 | 1 | 1 | 4.5 | 0 | 4 | 0 | 0 | 0 | 0 | 0 | 48.0 | 525 | 331 | 500 | 1 | 19 | 20 | 96 | 88 | 2.2 | 7.3 | 84 |
| 44 | 0.1 | 1 | 12 | 2 | 1 | 7 | 2 | 0 | 0 | 0 | 0 | 0 | 0 | 52.1 | 550 | 330 | 870 | 1 | 18 | 19 | 88 | 91 | 1.1 | 3.2 | 80 |
| 45 | 0.6 | 0.1 | 12 | 1 | 1 | 5.5 | 0 | 2.5 | 0.5 | 0 | 0 | 0 | 0 | 48.6 | 550 | 350 | 600 | 1 | 19 | 20 | 71 | 93 | 1.0 | 4.8 | 66 |
| 46 | 0.1 | 1 | 12 | 8 | 1 | 6 | 1.5 | 1.5 | 0 | 0 | 0 | 0 | 0 | 61.1 | 525 | 315 | 890 | 1 | 15 | 16 | 81 | 77 | 2.6 | 14.8 | 62 |
| 47 | 0.1 | 0.1 | 12 | 12 | 1 | 3 | 1.5 | 1.5 | 0 | 0 | 0 | 0 | 0 | 61.9 | 525 | 320 | 890 | 1 | 15 | 16 | 89 | 78 | 2.4 | 12.3 | 69 |
| 48 | 0.1 | 0.1 | 12 | 2 | 1 | 6 | 1 | 0 | 0 | 1 | 0 | 1 | 0 | 50.9 | 525 | 310 | 890 | 1 | 15 | 16 | 80 | 81 | 1.7 | 6.2 | 65 |
| 49 | 0.1 | 0.1 | 12 | 2 | 1 | 6 | 0 | 1.5 | 0 | 1.5 | 0 | 0 | 0 | 49.9 | 525 | 320 | 890 | 1 | 15 | 16 | 88 | 78 | 3.1 | 12.2 | 69 |
| 50 | 0.1 | 1 | 12 | 8 | 1 | 6 | 1.5 | 1.5 | 0 | 0 | 0 | 0 | 1 | 62.1 | 525 | 315 | 890 | 1 | 15 | 16 | 80 | 77 | 2.6 | 14.8 | 62 |
| 51 | 0.1 | 0.1 | 12 | 2 | 1 | 7 | 0 | 0 | 0 | 0 | 2 | 0 | 0 | 49.9 | 525 | 320 | 890 | 1 | 15 | 16 | 87 | 79 | 2.4 | 11.1 | 69 |

TABLE 3

| Example number | Catalyst composition: Tl | P | Mo | Fe | Bi | Ni | Co | Mg | Mn | O | 2d calcined temp. (° C.) | Reaction condition: Reaction temp. (° C.) | Space velocity (hr.⁻¹) | Feed composition (mol percent): 3-methyl butene-1 | 2-methyl butene-1 | 2-methyl butene-2 | $O_2$ | $N_2$ | Steam | Isopentene per pass conversion (percent) | Selectivity (percent): Isoprene | CO | $CO_2$ | Isoprene per pass conversion (percent) |
|---|---|---|---|---|---|---|---|---|---|---|---|---|---|---|---|---|---|---|---|---|---|---|---|---|
| 52 | 0.5 | 0.1 | 12 | 1 | 1 | 4.5 | 0 | 4 | 0 | 48.5 | 550 | 331 | 840 | 2.5 | 0 | 0 | 4.2 | 43 | 50 | 68 | 83 | 0.5 | 5.4 | 56 |
| 53 | 0.5 | 0.1 | 12 | 1 | 1 | 8.5 | 0 | 0 | 0 | 48.5 | 550 | 331 | 840 | 2.4 | 0 | 0 | 4.4 | 43 | 50 | 69 | 84 | 0.4 | 5.7 | 58 |
| 54 | 1 | 0.1 | 12 | 1 | 1 | 4.5 | 4 | 0 | 0 | 49.2 | 550 | 352 | 850 | 2.9 | 0 | 0 | 3.8 | 43 | 50 | 81 | 77 | 0.7 | 6.2 | 62 |
| 55 | 0.5 | 0.1 | 12 | 1 | 1 | 7.5 | 0 | 0 | 1 | 48.5 | 550 | 331 | 840 | 0 | 2.2 | 0 | 4.5 | 43 | 50 | 68 | 72 | 1.0 | 10 | 49 |
| 56 | 1 | 0.1 | 12 | 1 | 1 | 4.5 | 4 | 0 | 0 | 43.2 | 550 | 352 | 850 | 0 | 0 | 1.6 | 4.3 | 44 | 50 | 86 | 65 | 0.9 | 8.3 | 56 |
| 57 | 0.6 | 0.1 | 12 | 1 | 1 | 4.5 | 4 | 0 | 0 | 48.6 | 550 | 331 | 840 | 0 | 0 | 1.7 | 4.2 | 44 | 50 | 75 | 68 | 1.0 | 8.7 | 51 |
| 58 | 0.6 | 0.1 | 12 | 1 | 1 | 4.5 | 0 | 4 | 0 | 48.6 | 550 | 352 | 840 | 0.48 | 0.78 | 1.5 | 3.3 | 44 | 50 | 58 | 71 | 0.8 | 7.8 | 41 |
| 59 | 0.6 | 0.1 | 12 | 1 | 1 | 4.5 | 0 | 4 | 0 | 48.6 | 550 | 332 | 840 | 0.22 | 0.49 | 1.1 | 10 | 38 | 50 | 74 | 70 | 1.0 | 8.7 | 52 |

TABLE 4

| Example number | Catalyst composition: Tl | P | Mo | Fe | Bi | Ni | Co | Mg | Zn | Sn | Cd | O | 2d calcined temp. (° C.) | Reaction condition: Reaction temp. (° C.) | Space velocity (hr.⁻¹) | Feed composition (molar ratio): 3-methyl butene-1 | Air | Steam | Isopentene per pass conversion (percent) | Selectivity (percent): Isoprene | CO | $CO_2$ | Isoprene per pass conversion (percent) |
|---|---|---|---|---|---|---|---|---|---|---|---|---|---|---|---|---|---|---|---|---|---|---|---|
| 60 | 0.5 | 0.1 | 12 | 2 | 1 | 7 | 0 | 0 | 0 | 0 | 2 | 50.5 | 525 | 300 | 860 | 1 | 19 | 20 | 83 | 67 | 0.8 | 9.6 | 56 |
| 61 | 0.5 | 0.1 | 12 | 2 | 1 | 7 | 0 | 0 | 0 | 0 | 0 | 48.5 | 525 | 300 | 870 | 1 | 19 | 20 | 84 | 66 | 1.3 | 14.4 | 55 |
| 62 | 0.5 | 0.1 | 12 | 2 | 1 | 7 | 0 | 0 | 0 | 2 | 0 | 52.5 | 525 | 320 | 860 | 1 | 19 | 20 | 92 | 59 | 2.0 | 20.0 | 54 |
| 63 | 0.5 | 0.1 | 12 | 12 | 1 | 3 | 1.5 | 1.5 | 0 | 0 | 0 | 62.5 | 525 | 320 | 860 | 1 | 19 | 20 | 88 | 58 | 2.1 | 17.0 | 51 |

Reference Example 1

As in Example 8 but using no thallium, there is prepared a catalyst composition, of which the active components correspond to the formula:

$$P_{0.1}Mo_{12}Fe_1Bi_1Ni_{4.5}Co_4O_{47.7}$$

(wherein the carrier is omitted). The catalytic reaction of butene-1 to butadiene is carried out in the same reactor as in Example 1, in which a gaseous mixture of butene-1, air and steam (1:18:19 in molar ratio) is passed at a space velocity of 870 litre.gas/litre.catalyst/hr. over the said catalyst composition (6 ml.) heated at 310° C. The conversion of butene-1 is 69%, and the selectivities to butadiene, carbon monoxide and carbon dioxide are respectively 70%, 3.5% and 13%.

Reference Examples 2 to 5

Using the catalyst compositions shown in Table 5 which are prepared as in the foregoing examples but contain no thallium, the catalytic reaction of butene-1 to butadiene is carried out. The results are shown in Table 5.

Reference Example 6

The same catalyst composition (6 ml.) as in Reference Example 3 is charged in the same reactor as in Example 1, and a gaseous mixture containing butene-2 in the same ratio as in Example 47 is passed at a space velocity of 890 litre.gas/litre.catalyst/hr. over the said catalyst composition heated at 360° C. The conversion of butene-2 is 89%, and the selectivities to butadiene, carbon monoxide and carbon dioxide are respectively 37%, 9.5% and 37.7%. The per pass yield of butadiene is 33%.

Reference Examples 7 to 9

Using the catalyst compositions shown in Table 6 which are prepared as in the foregoing examples but contain no thallium, the catalytic reaction of butene-2 to butadiene is carried out. The results are shown in Table 6.

Reference Example 10

The same catalyst composition (6 ml.) as in Reference Example 7 is charged in the same reactor as in Example 1, and a gaseous mixture in the same ratio as in Example 56 is passed at a space velocity of 840 litre.gas/litre.catalyst/hr. over the said catalyst composition heated at 352° C. The conversion of 2 methylbutene-2 is 70%, and the selectivities to isoprene, carbon monoxide and carbon dioxide are respectively 29%, 5.2% and 44.4%.

Reference Example 11

The same non-Tl catalyst composition (6 ml.) as in Reference Example 3 is charged in the same reactor as in Example 1, and a gaseous mixture containing 3-methylbutene-1 in the same ratio as in Example 63 is passed at a space velocity of 860 litre.gas/litre.catalyst/hr. over the said catalyst composition heated at 340° C. The conversion of 3-methylbutene-1 is 91%, and the selectivities to isoprene, carbon monoxide and carbon dioxide are respectively 33%, 5.8% and 46%. The per pass yield of isoprene is 30%.

Reference Example 12

As in Example 62 but using no thallium, there is prepared a catalyst composition, of which the active components correspond to the formula:

$$P_{0.1}Mo_{12}Fe_2Bi_1Ni_7Sn_2O_{51.7},$$

and this catalyst composition (6 ml.) is charged in the same reactor as in Example 1. A gaseous mixture containing 3-methylbutene-1 in the same ratio as in Example 62 is passed at a space velocity of 860 litre.gas/litre.catalyst/hr. over the said catalyst composition heated at 320° C. The per pass conversion of 3-methylbutene-1 is 54%, and the selectivities of isoprene, carbon monoxide and carbon dioxide are respectively 45%, 5.0% and 44%. The per pass yield of isoprene is 24%.

TABLE 5

| Reference example number | Catalyst composition | | | | | | | | | | | 2d calcined temp. (° C.) | Reaction condition | | Feed composition (molar ratio) | | | Butene-1 per pass conversion (percent) | Selectivity (percent) | | | Butadiene per pass yield (percent) |
|---|---|---|---|---|---|---|---|---|---|---|---|---|---|---|---|---|---|---|---|---|---|---|
| | P | Mo | Fe | Bi | Ni | Co | Mg | Mn | Zn | Pb | O | | Reaction temp. (° C.) | Space velocity (hr.⁻¹) | Butene-1 | Air | Steam | | Butadiene | CO | $CO_2$ | |
| 2 | 0.1 | 12 | 1 | 1 | 5.5 | 1 | 1 | 1 | 0 | 0 | 47.7 | 525 | 310 | 840 | 1 | 19 | 20 | 74 | 68 | 4.6 | 16 | 50 |
| 3 | 0.1 | 12 | 12 | 1 | 3 | 1.5 | 1.5 | 0 | 0 | 0 | 61.7 | 525 | 315 | 890 | 1 | 15 | 16 | 62 | 61 | 5.4 | 22.7 | 38 |
| 4 | 0.1 | 12 | 2 | 1 | 7 | 0 | 0 | 0 | 2 | 0 | 49.7 | 525 | 330 | 890 | 1 | 16 | 17 | 66 | 55 | 6.7 | 22.8 | 36 |
| 5 | 0.1 | 12 | 12 | 1 | 3 | 1.5 | 1.5 | 0 | 0 | 1 | 62.7 | 525 | 320 | 890 | 1 | 15 | 16 | 65 | 65 | 4.5 | 18.5 | 42 |

TABLE 6

| Reference example number: | Catalyst composition | | | | | | | | | | 2d calcined temp. (° C.) | Reaction condition | | Feed composition (molar ratio) | | | Butene-2 per pass conversion (percent) | Selectivity (percent) | | | Butadiene per pass yield (percent) |
|---|---|---|---|---|---|---|---|---|---|---|---|---|---|---|---|---|---|---|---|---|---|
| | P | Mo | Fe | Bi | Ni | Co | Mg | Mn | Zn | O | | Reaction temp. (° C.) | Space velocity (hr.⁻¹) | Butene-2 | Air | Steam | | Butadiene | CO | $CO_2$ | |
| 7 | 0.1 | 12 | 1 | 1 | 4.5 | 4 | 0 | 0 | 0 | 47.7 | 550 | 330 | 850 | 1 | 19 | 20 | 83 | 51 | 5.7 | 24 | 42 |
| 8 | 0.1 | 12 | 1 | 1 | 4.5 | 4 | 0 | 0 | 0 | 47.7 | 550 | 350 | 850 | 1 | 19 | 20 | 98 | 40 | 7.8 | 39 | 39 |
| 9 | 0.1 | 12 | 2 | 1 | 7 | 0 | 0 | 0 | 2 | 49.7 | 525 | 340 | 890 | 1 | 15 | 16 | 65 | 62 | 6.3 | 31.4 | 40 |

What is claimed is:

1. A process for preparing diolefins by the vapor phase oxidation of monoolefins which comprises contacting a monoolefin having 4 to 8 carbon atoms and oxygen with a solid catalyst composition comprising a catalyst system of the formula: $Tl_aP_bMo_cFe_dBi_eX_fY_gO_h$ wherein *a, b, c, d, e* and *h* each represents the number of atoms, respectively, X is one or more of Ni, Co, Mg and Mn, *f* represents the total number of one or more atoms of Ni, Co, Mg and Mn, Y is one or more of Cu, Ca, Sr, Zn, Cd, Sn, Be, Cr and Pb, and *g* represents the total number of one or more atoms of Cu, Ca, Sr, Zn, Cd, Sn, Be, Cr and Pb, and wherein *c* is 12, *a* is 2 or less but not less than a catalytic amount, *b* is 0 to 5, *d* is 0.1 to 20, *e* is 0.1 to 5, *f* is 2 to 15, *g* is 0 to 12, and *h* is a number determined by the valence requirements of the other atoms.

2. The process according to claim 1, wherein *c* is 12, *a* is 0.01 to 1.5, *b* is 0.01 to 2, *d* is 0.5 to 20, *e* is 0.5 to 5, *f* is 2 to 15, *g* is 0 to 8, and *h* is 39.5 to 103.8.

3. The process according to claim 1, wherein *f* plus *g* is 2 to 15.

4. The process according to claim 1, wherein the contact is effected at a temperature from 230 to 400° C.

5. The process according to claim 1, wherein the contact is effected under a pressure from 0.5 to 10 absolute atmospheres.

6. The process according to claim 1, wherein the contact is effected at a space velocity of 100 to 10,000 litre. gas/litre.catalyst/hr.

7. The process according to claim 6, wherein the contact is effected at a space velocity of 200 to 5,000 litre. gas/litre.catalyst/hr.

8. The process according to claim 1, wherein the oxygen source is air.

9. The process according to claim 1, wherein the molar ratio of the monoolefin to oxygen is 1:0.2–10.

10. The process according to claim 1, wherein the contact is effected in the presence of steam.

11. The process according to claim 8, wherein the molar ratio of them onoolefin to steam is 1:2–30.

12. The process according to claim 1, wherein said catalyst composition is incorporated with a carrier selected from the group consisting of silica, alumina, silicon carbide and titanium oxide.

13. The process according to claim 12, wherein the amount of the carrier is less than 90% by weight of said catalyst composition.

14. The process according to claim 12, wherein the amount of the carrier is from 5 to 90% by weight of said catalyst composition.

15. The process according to claim 1, wherein *h* is 38.3 to 128.

References Cited

UNITED STATES PATENTS

| | | | |
|---|---|---|---|
| 3,741,910 | 6/1973 | Shiraishi et al. | 252—437 |
| 3,746,656 | 7/1973 | Shiraishi et al. | 252—437 |
| 3,414,631 | 12/1968 | Grasselli et al. | 260—680 |
| 3,642,930 | 2/1972 | Grasselli et al. | 260—680 |

PAUL M. COUGHLAN, Jr., Primary Examiner

U.S. Cl. X.R.

252—437, 464; 260—683.2